United States Patent
Brock

(10) Patent No.: US 6,261,124 B1
(45) Date of Patent: Jul. 17, 2001

(54) CONNECTORS

(75) Inventor: Peter A. Brock, London (GB)

(73) Assignee: Deltron Components Limited, London (GB)

( * ) Notice: Subject to any disclaimer, the term of this patent is extended or adjusted under 35 U.S.C. 154(b) by 0 days.

(21) Appl. No.: 09/534,353

(22) Filed: Mar. 24, 2000

Related U.S. Application Data

(63) Continuation of application No. PCT/GB98/02901, filed on Sep. 25, 1998.

(30) Foreign Application Priority Data

Sep. 25, 1997 (GB) .................................................. 9720449

(51) Int. Cl.⁷ ................................................. H01R 13/60
(52) U.S. Cl. ...................................... 439/540.1; 439/668
(58) Field of Search ................... 439/540.1, 545, 439/701, 717, 638, 688, 689

(56) References Cited

U.S. PATENT DOCUMENTS

| | | | |
|---|---|---|---|
| 4,080,040 | * 3/1978 | Lancaster | 439/668 |
| 4,695,116 | * 9/1987 | Bailey et al. | 439/188 |
| 5,391,095 | * 2/1995 | Born | 439/676 |
| 5,709,554 | * 1/1998 | Savage, Jr. | 439/541.5 |
| 6,116,959 | * 9/2000 | Taylor | 439/668 |

FOREIGN PATENT DOCUMENTS

| | | |
|---|---|---|
| 0 330 765 | 6/1989 | (EP) . |
| 9 485 245 | 5/1992 | (EP) . |
| 2 697 380 | 4/1994 | (FR) . |
| 94 08429 | 4/1994 | (WO) . |

* cited by examiner

Primary Examiner—Renee Luebke
Assistant Examiner—Briggitte R. Hammond
(74) Attorney, Agent, or Firm—Nixon & Vanderhye

(57) ABSTRACT

A connector module (4) may be fixed to a patch bay panel (2), or may be engaged with other connector modules to form a patching apparatus. The connector module (4) has a body (14) of insulating material in which jack sockets (6) are defined. Connectors (20) are received within connector channels (18) in the body and selectively interconnect the jack sockets. The body (14) is received within a tubular housing (30) of insulating material which encompasses the jack sockets (6), the connectors (20) and the interconnecting means to protect the module from dust. The housing (30) also carries panel engagement means (104) for clipping the module (4) to a patch bay panel (2). Cooperating engagement means (132, 134) on the top and base surfaces of the housing (30) enable adjacent modules (4) to be engaged.

13 Claims, 6 Drawing Sheets

CONNECTORS

This is a continuation of PCT application No. PCT/GB98/02901, filed Sep. 25, 1998, the entire content of which is hereby incorporated by reference in this application.

The present invention relates to a connector module.

In the audio field, for example, patching systems are used to enable interconnections to be made in an orderly fashion. Generally, such interconnections are made by way of jack plugs and sockets, the jack sockets, for example, being installed in a patch bay and being appropriately interconnected.

In a known audio patch bay system, a plurality of patch bay modules are supported in a panel. Each patch bay module incorporates four jack sockets, with two of the sockets opening at the front of the panel, and the other two sockets opening at the rear. The four jack sockets are mounted and interconnected by a printed circuit board (pcb) to which terminals of the jack sockets have to be soldered. To change the mode of a module, for example from normal to de-normal or vice versa, it is necessary either to remove solder links or to reverse the orientation of the patch bay module in the panel. Reversal of a module requires that supporting nuts be removed, and then be reapplied after the module has been turned through 180° and refitted into the panel.

It is an object of the present invention to provide an improved connector module, for example, for use in patching apparatus.

According to a first aspect of the present invention there is provided a connector module comprising a body of insulating material defining a plurality of jack sockets, and interconnecting means of conductive material for selectively connecting jack sockets, wherein said interconnecting means are not defined by, or supported on, a printed circuit board.

A connector module of an embodiment of the invention does not use a pcb, as is conventional, to make contacts between the jack sockets and any other circuit components. This avoids the disadvantage of pcbs, namely vibration fatigue or dry joints at the solder links.

Preferably, said interconnecting means have been selectively connected to said jack sockets by mechanical connection techniques.

According to a further aspect of the present invention there is provided a connector module comprising a body of insulating material defining a plurality of jack sockets, and interconnecting means of conductive material for selectively connecting jack sockets, wherein said interconnecting means have been selectively connected to said jack sockets by mechanical connection technique.

It has been found that mechanical connection techniques for making the electrical interconnections are simple and fast and are much more cost effective than pcb constructions.

In a preferred embodiment, the mechanical connection techniques utilise insulation displacement methods. For example, jack terminals may be connected to, or defined by, connectors carrying insulation displacement contacts.

Preferably, said body of insulating material is formed in a single piece, for example, as a single moulding.

The present invention also extends to a connector module comprising a body of insulating material defining a plurality of jack sockets, and interconnecting means of conductive material for selectively connecting jack sockets, wherein said body of insulating material is formed in a single piece.

In an embodiment, said body of insulating material is formed as a single moulding.

Where the body is fabricated in one piece, there is no risk of individual jack sockets or individual connectors carried by the moulding becoming loose.

In a preferred embodiment, said body of insulating material defines a plurality of substantially identical jack sockets arranged in a common plane, with the socket opening of some jack sockets facing in one direction, and the socket opening of the remainder of the jack sockets facing in the opposed direction.

Preferably, the body of insulating material defines a plurality of connector channels.

In an embodiment, each connector channel is arranged to receive one or more connectors of conductive material. Some or each of said conductive connectors may carry one or more insulation displacement contacts. Connectors in the connector channels may be arranged to define jack socket terminals.

In an embodiment, the connector channels preferably extend substantially parallel to one another.

Additionally and/or alternatively, said connector channels may extend substantially transversely to the jack sockets.

Additionally and/or alternatively, each connector channel may extend across a plurality of jack sockets.

Preferably, said body of insulating material defines recesses or channels therein to receive said interconnecting means.

A connector module as defined above may be used in patching apparatus.

The present invention additionally extends to patching apparatus comprising a patch panel having a plurality of connector modules as defined above supported thereby.

However, if required, a connector module as defined above may be used singularly, for example, as a splitter and/or extender for cables.

Connector modules as defined above may be interconnected to form patching apparatus. That is, the conventional patch panel may be dispensed with.

According to a further aspect of the present invention there is provided patching apparatus comprising a plurality of individual connector modules arranged adjacent to one another, each said connector module defining a number of jack sockets and comprising interconnecting means selectively connecting the jack sockets, and wherein each said connector module is engaged to the adjacent connector module(s) whereby the patching apparatus is defined.

In an embodiment of this aspect of the invention, the connector modules are engaged to define the patching apparatus and thus no patch panel is required. The cost of the patching apparatus is thereby reduced and assembly can be facilitated.

It is possible to engage adjacent connector modules by any appropriate engagement means. In a preferred embodiment, the connector modules carry cooperating engagement means.

For example, each connector module may have projecting engagement means on one surface thereof and corresponding and cooperating recessed engagement means on an opposed surface thereof.

Said connector module may further comprise a base plate of insulating material fixed to said body of insulating material.

For example, the base plate may be adhered or bonded to said body.

Said base plate of insulating material is preferably arranged to enclose said jack sockets and said interconnecting means.

In a preferred embodiment, said connector module may further comprise a housing, for example, of insulating material, in which said body is received.

Preferably, said housing is tubular and is arranged to encompass the interconnecting means and said jack sockets.

According to a still further aspect of the present invention there is provided a connector module comprising a body of insulating material defining a plurality of jack sockets, and interconnecting means of conductive material for selectively connecting jack sockets, and further comprising a housing of insulating material encompassing said body.

Preferably, a connector module as defined above further comprises identification means to identify the selected interconnections of said interconnecting means.

According to a still further aspect of the present invention there is provided a connector module comprising a body of insulating material defining a plurality of jack sockets, and interconnecting means of conductive material for selectively connecting jack sockets, and further comprising identification means to identify the selected interconnections of said interconnecting means.

The identification means may comprise any convenient means. Preferably, the identification means provide a visual indication, and, in a preferred embodiment, colour codings are provided. For example, coloured markers may be appropriately affixed to said body of insulating material.

In one embodiment, each connector module has jack socket openings in opposed ends thereof, and has asymmetrical interconnections which provide different electrical pathways in dependence upon the orientation of the module. In that case, it is appropriate, for example, to have differing colour markers at the opposed ends of the connector module to indicate the orientation of the module.

Preferably, a connector module as defined above comprises fixing means enabling the module to be fixed to a panel.

In one embodiment, a front surface of the connector module is provided with a screw hole for receipt of a fixing screw.

Embodiments of the present invention will hereinafter be described, by way of example, with reference to the accompanying drawings, in which:

FIG. 1b shows a plan view from above of the apparatus of FIG. 1a,

FIG. 1c shows an enlarged view of part of the front elevation of FIG. 1a,

Figure 1A:
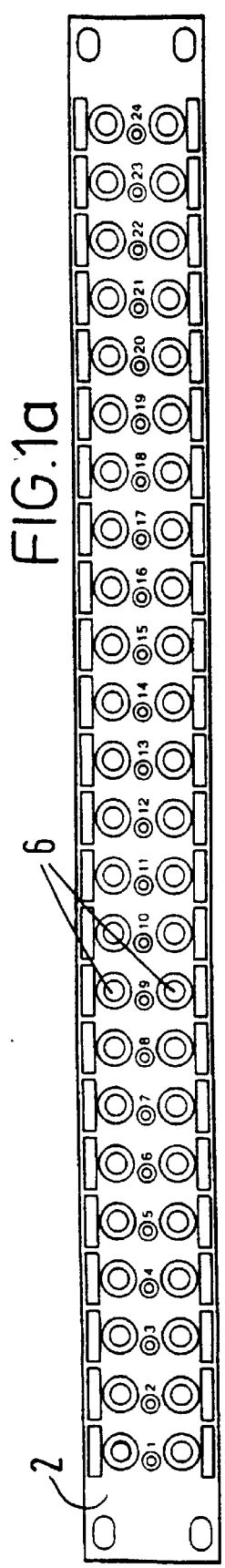
FIG. 1a shows a front elevation of patching apparatus of the present invention.
Figure 1B:
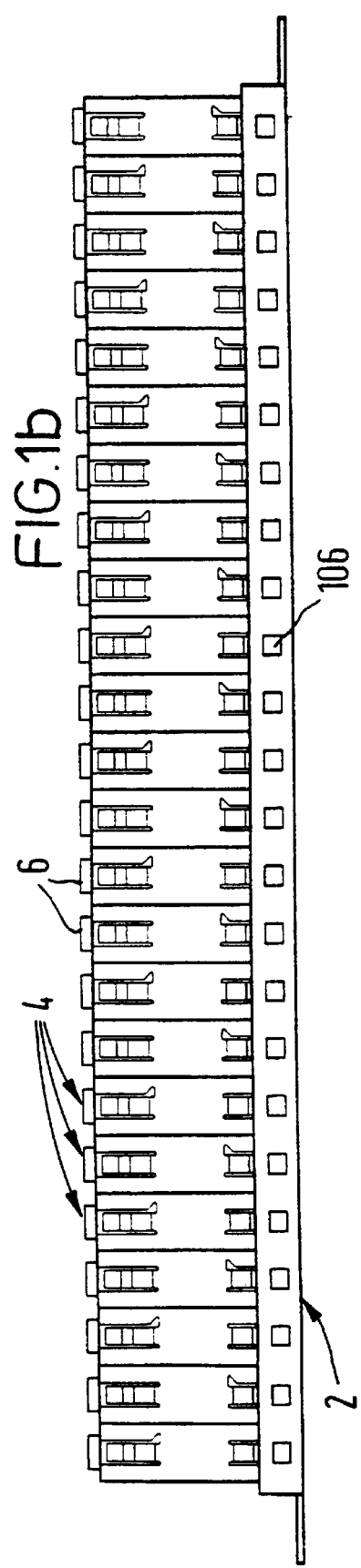
Figure 2A:
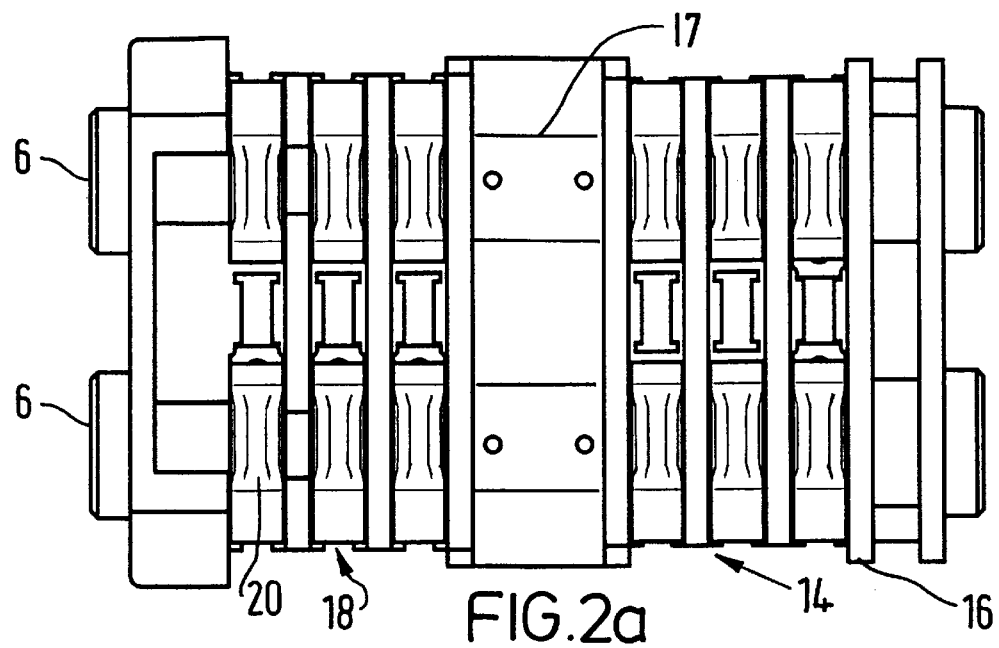
Figure 2B:
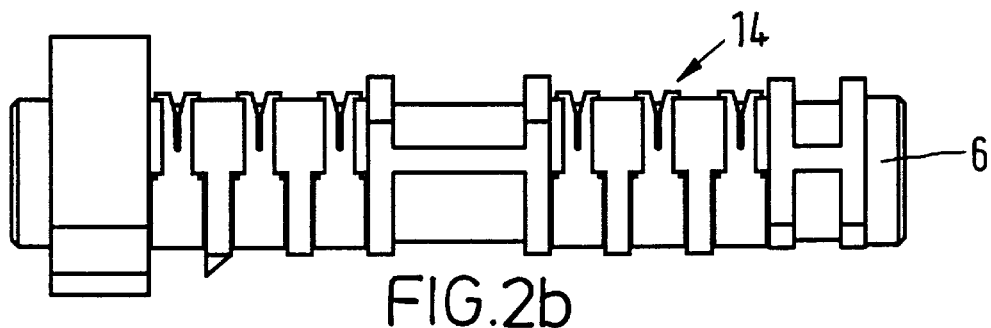
Figure 2C:
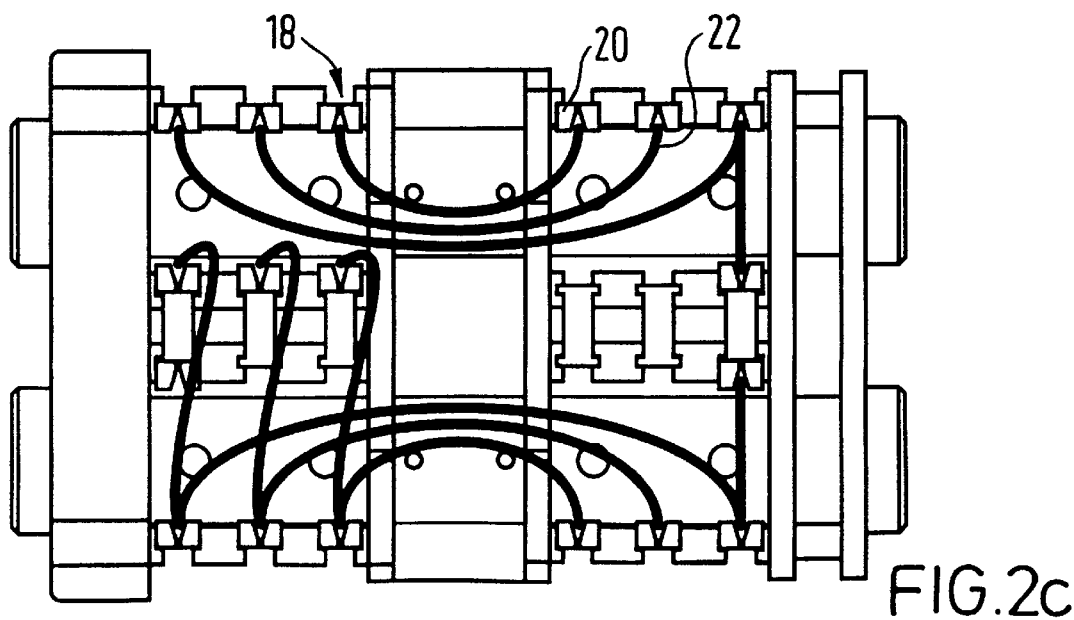
Figure 3:
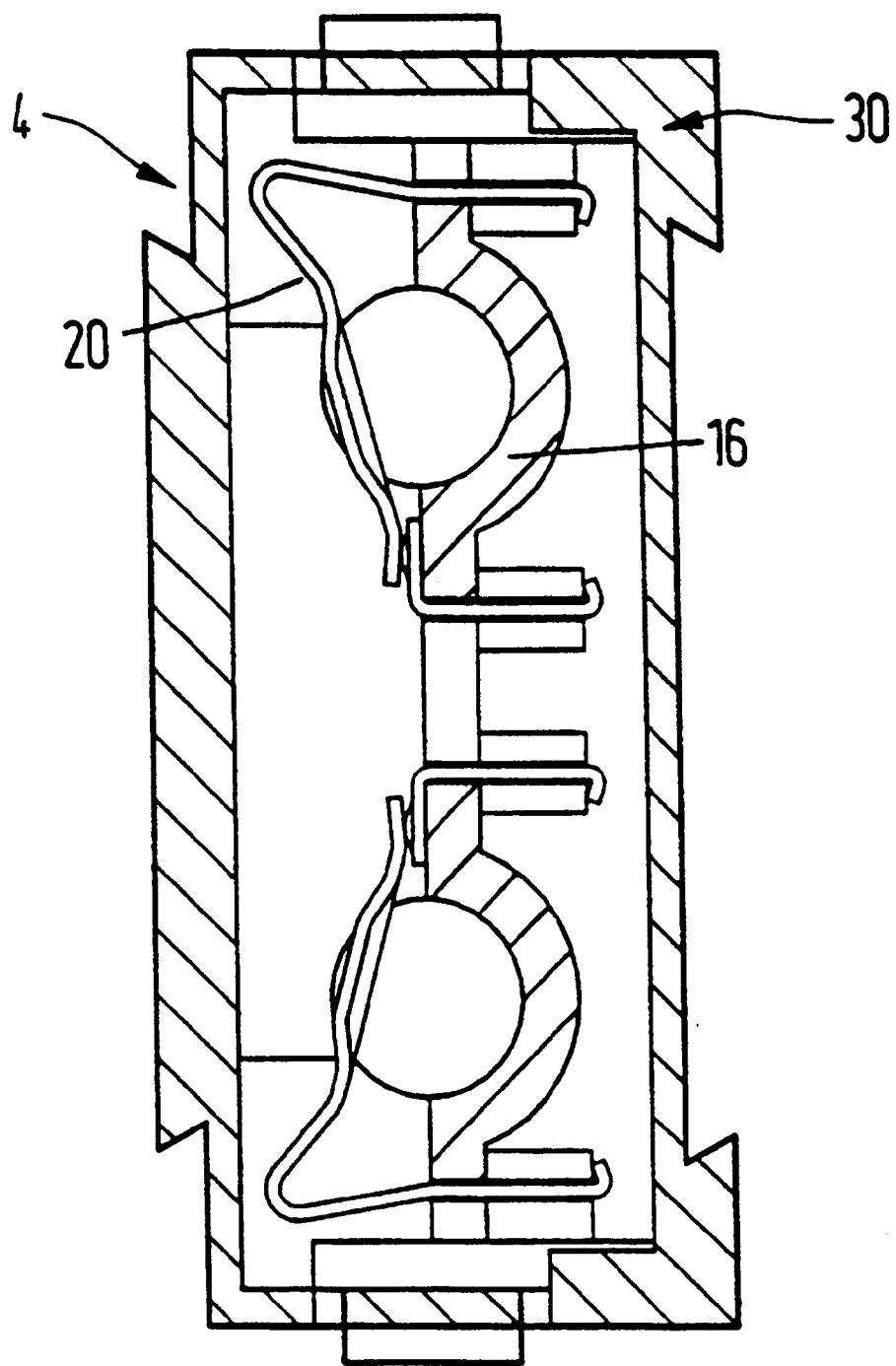
Figure 4:
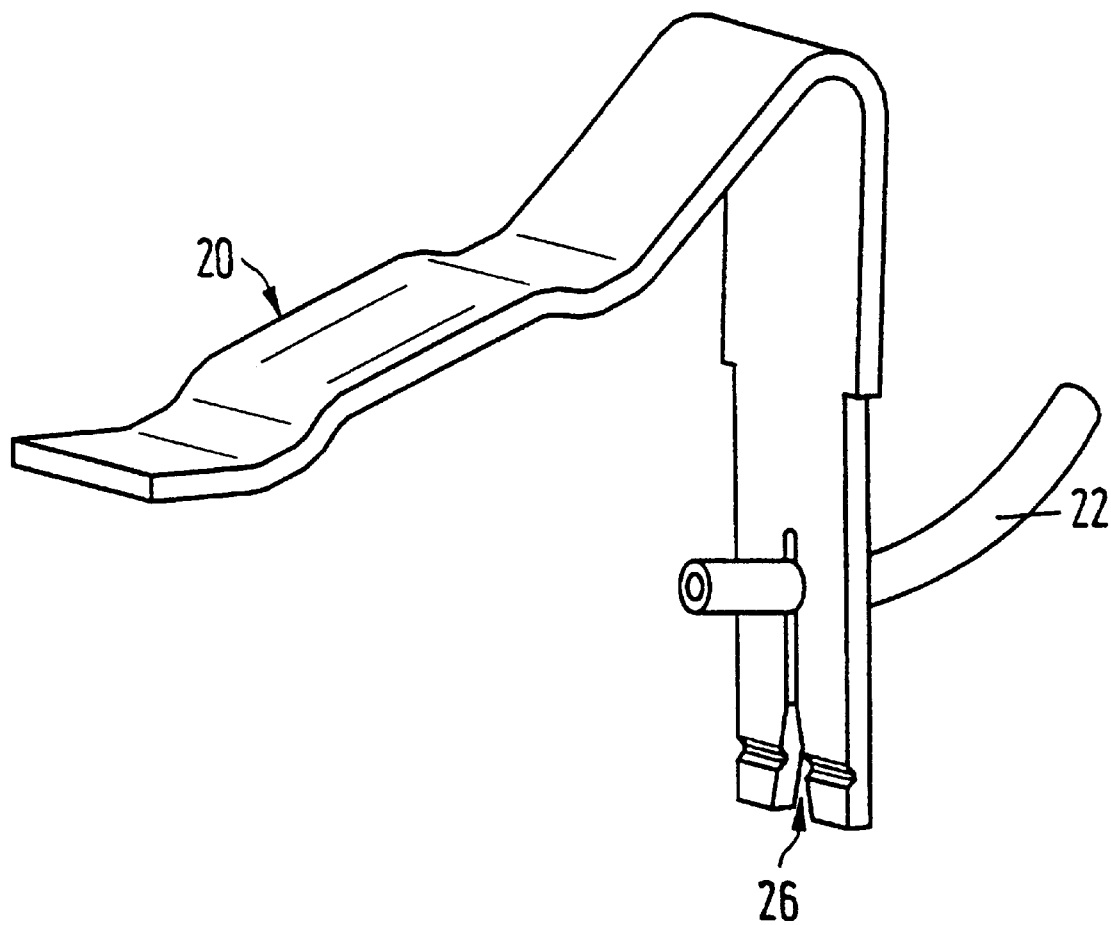
Figure 5A:
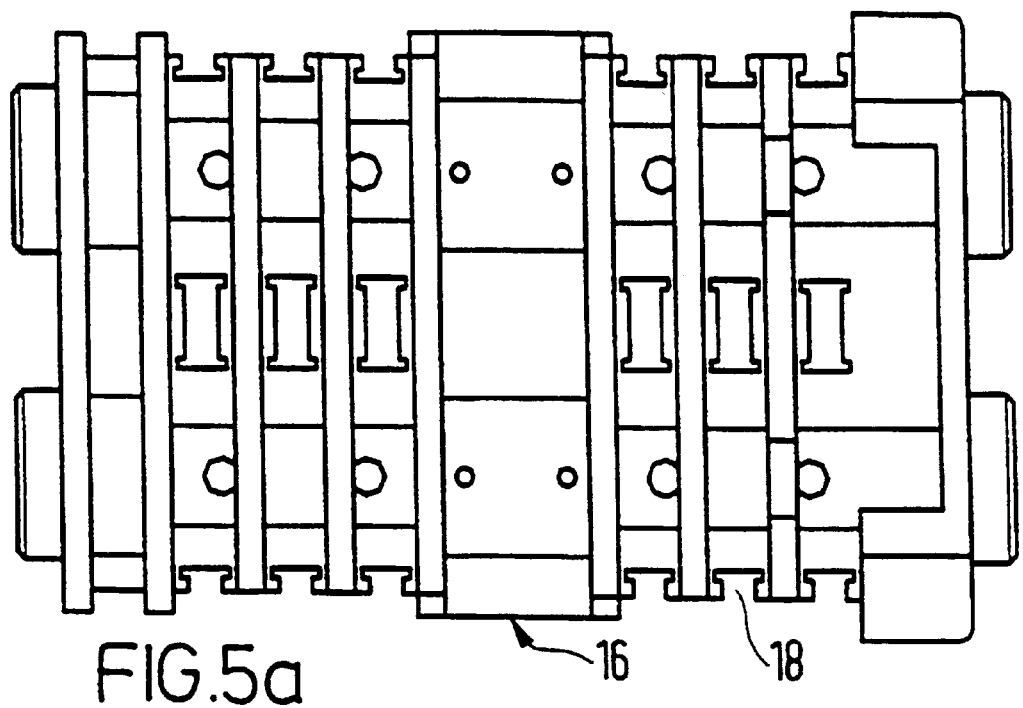
Figure 5B:
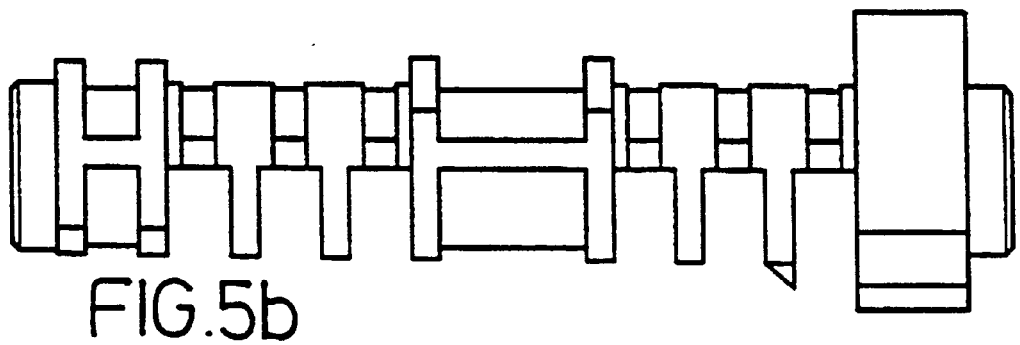
Figure 5C:
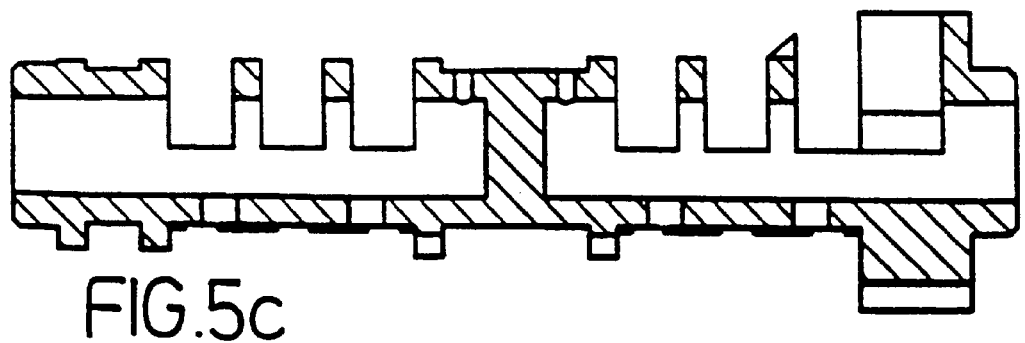
Figure 6A:
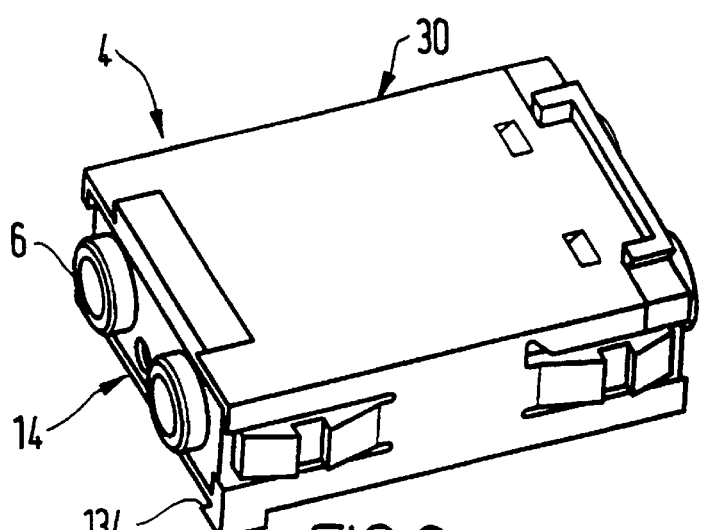
Figure 6B:
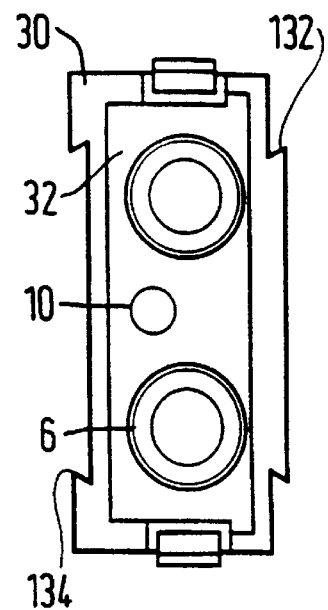
Figure 6C:
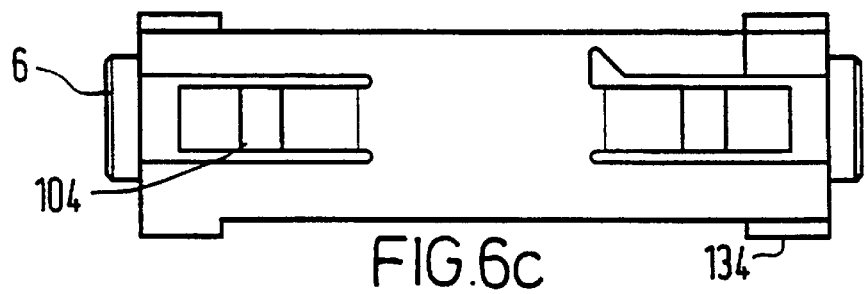
Figure 6D:
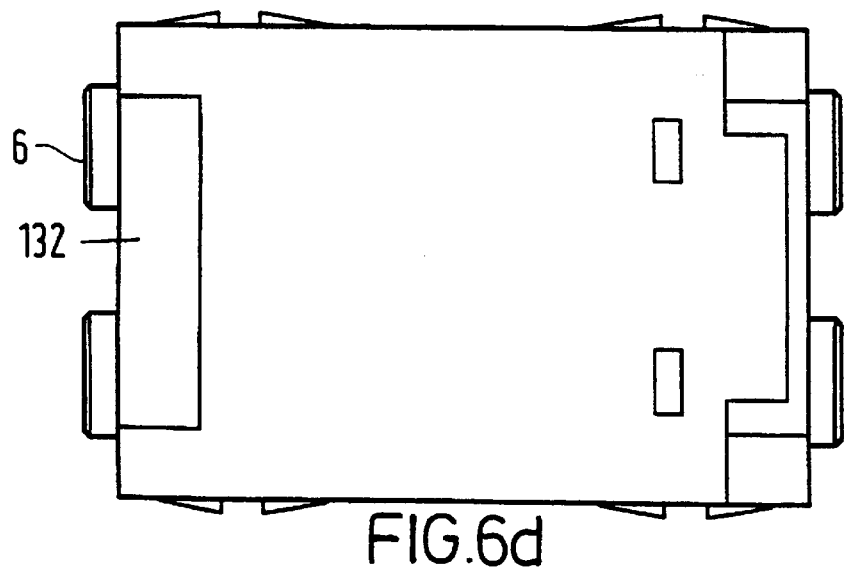

FIG. 2a shows a plan view from above of a body of a connector module of the invention incorporated in the apparatus of FIGS. 1a and 1b, FIG. 2b shows a side view of the connector body of FIG. 2a, FIG. 2c shows an underneath plan view of the connector body of FIG. 2a, FIG. 3 shows a transverse section of a connector module of the invention incorporating the connector body of FIG. 2a, FIG. 4 shows a connector of a connector module of the invention illustrating insulation displacement contacts thereof, FIG. 5a shows a plan view from above of a plastics material moulding of the body of a connector module as illustrated in FIG. 2a, FIG. 5b shows a side view of the moulding of FIG. 5a, FIG. 5c shows a section taken along line A—A of FIG. 5a, FIG. 6a shows a perspective view of a connector module of the invention having a connector body received within a housing, FIG. 6b shows a view of one end of the connector module of FIG. 6a, FIG. 6c shows a side view of the connector module showing clips for clipping the module to a panel to form patching apparatus, and FIG. 6d shows a plan view from above of the connector module of FIG. 6a.

The patching apparatus illustrated in the drawings comprises a patch bay specifically designed for use in the professional audio industry and incorporating connector modules of the present invention. These connector modules have four jack sockets and are arranged to be used in one of two alternative orientations to provide a normal or a de-normal mode.

The invention is described below with specific reference to the illustrated connector module. However, the invention is not limited to connector modules for use in the audio industry, nor to connector modules having four jack sockets, nor to connector modules which are physically symmetrical, but electrically asymmetrical, and thereby capable of being selectively oriented to present a selected one of two modes. Furthermore, the invention is not limited to connector modules specifically for use with patch bay panels or in other patching apparatus.

For example, a connector module of the present invention may be used individually as a splitter and/or extender for cables. As the interconnections of the jack sockets are, as will be described, enclosed, a single connector module of the invention is particularly useful for this application.

Furthermore, connector modules of the invention may be engaged one with the other to form a patching apparatus without the need for a patch bay panel.

Furthermore, a connector module for any application, having any number of jack sockets, oriented as required, is within the scope of the invention.

Figure 1C:
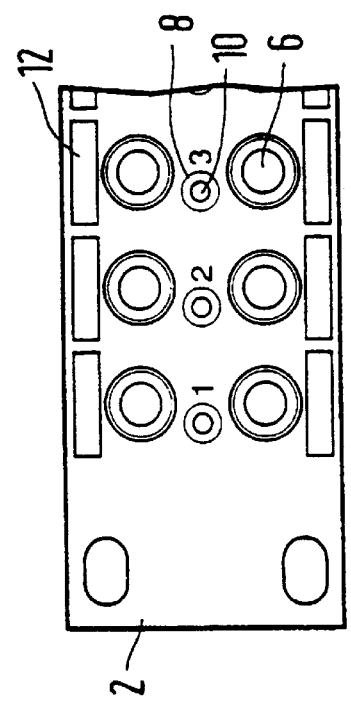

FIGS. 1a to 1c show patching apparatus in the form of a patch bay for audio applications. As is apparent, and is well known, the patch bay comprises a patch bay panel 2 supporting a number of individual patch bay modules 4. FIGS. 1a to 1c show a patch bay incorporating twenty four connector or patch bay modules 4. All of the modules 4 may be connector modules in accordance with an embodiment of the invention. Alternatively, some of the modules in the patchbay may each have a housing substantially identical to that of a connector module, but housing passive or active circuits or equipment therein.

Each individual connector module 4 has four jack sockets, indicated at 6, arranged in a common plane and arranged symmetrically such that two jack sockets open in one end of the module, and the other two open in the opposed end thereof. Such an arrangement is well known. As is also well known, the jack sockets 6 within each module 4 are selectively interconnected and/or interconnected to switching means and other circuits incorporated within each module 4. For the audio industry, each audio module 4, whilst being physically symmetrical, is electrically asymmetrical, and can be rotated through 180° so that in one orientation it provides a normal mode, and in the reverse orientation it provides the de-normal mode.

In the embodiment of the invention illustrated, the panel 2 of the patch bay has a plurality of indicating holes 8, each associated with the pair of jack sockets 6 at one end of a corresponding connector module 4. As will be seen, indicating means 10 carried by each individual connector module 4 are visible through the indicating holes 8. These indicating means 10 are used to indicate the orientation of each connector module 4.

As will become apparent, each connector module 4 is secured to the panel 2 by engagement of its jack sockets 6, and by way of fixing means described further below. Furthermore, a number of "scribble strips", indicated at 12, may be provided on the panel 2, each adjacent a respective jack socket 6.

The connector body, generally referenced 14, of a connector module 4 of the invention is shown in FIGS. 2a to 2c. The connector body 14 comprises a moulding 16 of insulating material, for example, made as a one piece moulding of plastics material. The moulding 16 is illustrated in FIGS. 5a to 5d. The body 14 defines four jack sockets 6 arranged in a common plane. The jack sockets 6 are arranged symmetrically about both longitudinal and transverse axes of the connector body 14, with two jack sockets 6 opening in one end of the body 14 and the other two jack sockets 6 opening in the opposed end thereof. The body 14 includes two cylindrical posts 17 each joining and supporting two respective aligned jack sockets 6.

As is clear from FIGS. 2a to 2c, for example, the connector body 14 is moulded to define therein a number of connector channels 18 which extend substantially parallel to each other, and also extend substantially transversely to the longitudinal extent of the jack sockets 6. In the embodiment illustrated, there are six channels 18, and each connector channel 18 extends across two adjacent jack sockets 6.

Each connector channel 18 may house one or more connectors 20. These connectors 20 are made of conductive material and are appropriately shaped and engaged, for example, to define terminals of respective jack sockets 6. The connector or connectors 20 in each channel 18 may be shaped to define contacts or switches, for example. Other circuits may be incorporated within the channels 18 if required, either alone or together with connectors 20. In some arrangements, selected channels 18 may remain empty.

In known manner, the terminals defined by the connectors 20 of the jack sockets 6 are selectively interconnected. The interconnecting means are indicated in the underneath plan view shown in FIG. 2c. As is indicated, the interconnecting means comprise a number of insulated wires, as 22, connecting selected ones of the connectors 20. These wires 22 are received within appropriate recesses or groves extending within the connector body 14 and are connected to the connectors 20 by use of insulation displacement methods.

FIG. 4 shows a connector 20 of the connector module 4 and shows the provision at a free end thereof of insulation displacement contacts 26. It will be appreciated that, as indicated in FIG. 4, an insulated wire 22 may be electrically connected to the connector 20 by its insertion in the insulation displacement contacts 26 in known manner.

FIGS. 5a to 5c show views of the moulding 16, which has been moulded in a single piece in plastics material to define the connector body 14 and hence to define bores for receiving the four jack sockets 6 and to define the connector channels 18.

A connector module 4 of the invention is easy to manufacture. A moulding 16 as shown in FIGS. 5a to 5c is formed. Thereafter, the connector body 14 is provided with the connectors 20 which are fitted into the channels 18 and which are then interconnected, for example, as indicated in FIG. 2c. Thereafter the connector body 14 is slid into a housing 30 therefor. A section showing the connector body 14 received within the housing 30 to form the connector module 4 is shown in FIG. 3.

Because of the presence of the housing 30, the connector module 4 can be used as a splitter or extender for cables. The housing 30 provides protection against dust and hence in audio applications provides crackle free operation. The housing 30 is preferably moulded from the same plastics material as is used to form the connector body 14.

At each end of its ends 32 (FIG. 6b), the completed connector body 14 may have a coloured dot 10. The dot 10 at different ends of the connector body 14 will be of a different colour to indicate the orientation of the body 14, and hence the direction of the normal and de-normal modes, for example, thereof. It will be appreciated that when the module 4 is affixed to the panel 2, the colour of the dot 10 on the end surface 32 will be visible in the corresponding indicating hole 8.

The connector module 4 described and illustrated is particularly designed for engagement with other connector modules to form a patching apparatus comprised of a row of interengaged connector modules. However, and as shown in FIG. 1, the modules 4 may additionally be fixed to the patch bay panel 2.

FIGS. 6a to 6b show views of the connector module 4 with the body 14 thereof received within the tubular housing 30. As is apparent from FIG. 3, the housing 30 extends over the top, base and sides of the connector body 14 to enclose the body 14.

The housing 30 encompasses the jack sockets 6, the connectors 20 and the interconnecting means (not visible) and thereby protects the module from dust. The housing 30 also carries panel engagement means 104 for fixing the module 4 to a patch bay panel. Such panel engagement means 104 comprise retention tabs arranged for engagement in corresponding cut outs 106 (FIG. 1b) in the patch bay panel 2. The projections 104 have some flexibility to enable the module to be clipped on, or unclipped from, the panel simply and easily.

In use, whether supported on a panel or not, connector modules 4 are generally arranged adjacent one another in a row, for example, as shown in FIG. 1b, with the top of one module adjacent the base of the next. The modules 4 described and illustrated have cooperating engagement means 132, 134 on the top and base surfaces of the housing 30 whereby adjacent modules 4 may be engaged. In the embodiment illustrated, a projecting tongue 132 on the top of one module is arranged to be dovetailed with a corresponding groove 134 on the base of the adjacent module. However, alternative engagement means may be provided. Furthermore, the modules may be engaged together in other orientations if required.

It is advantageous to engage adjacent modules together, even where a patch bay panel is used, especially where the modules are to be clipped to the panel. In this respect, when using clips, as 104, to secure the modules, there is a risk that the module will twist with respect to the panel. This risk is avoided by engaging the modules together.

As has been indicated previously, when a number of connector modules 4 are to be used together to form a patching apparatus, other elements may be assembled with the connector modules by housing the further elements (not illustrated) in appropriate equipment housings (not shown) to form equipment modules. Each equipment housing will have generally the same transverse and longitudinal dimensions as a housing 30, and may have engagement means 132, 134 and clips as 104. Each equipment housing may have the same depth as a housing 30 or may have a depth substantially equal to a multiple of the depth of a housing 30. It will be appreciated that such equipment modules may be readily assembled with the connector modules 4. It will also be appreciated that any required circuits, devices, apparatus or equipment may be housed in such equipment modules. Examples of such equipment are: connectors, switches, electrical circuits, indicators, signal processing means, and measuring means.

Whilst it is currently preferred to house each connector body within a housing to form the connector module and enclose the interconnections, it would be alternatively possible simply to fix the base of the body 14 to a base plate.

In the embodiment described and illustrated, the connector modules are engaged together and are also each clipped to a patch bay panel. It would alternatively be possible to omit the panel. Furthermore, irrespective of the presence or absence of the panel, the modules may be interconnected, and/or connected to any external means, such as a panel, by any appropriate fixing means.

It will be appreciated that other modifications to, and variations in, the embodiments described and illustrated may be made within the scope of this application.

What is claimed is:

1. A connector module for a patching apparatus, said connector module comprising a body of insulating material having a common plane extending therethrough, a plurality of substantially identical jack sockets being defined by said body of insulating material, the plurality of jack sockets being arranged in said common plane, each jack socket having a socket opening at one end thereof, the socket openings of some jack sockets facing in one direction, and the socket openings of the remainder of the jack sockets facing in the opposed direction, the body of insulating material defining a plurality of connector channels, wherein the connector channels extend substantially parallel to one another, and each said connector channel extends across the plurality of jack sockets, and the connector module further comprising a plurality of connectors of conductive material for interconnecting selected jack sockets, one or more of said connectors being received within each said connector channel, and the connector module further comprising a tubular housing in which the body of insulating material and said connectors are removably received, wherein said housing carries co-operating engagement means for engaging with the housings of adjacent connector modules, and wherein said housing carries panel engagement means for engagement with a patch panel of patching apparatus.

2. The connector module according to claim 1, wherein said conductive connectors are not defined by, or supported on, a printed circuit board.

3. The connector module according to claim 1, wherein said conductive connectors are selectively connected to said jack sockets by mechanical connection techniques.

4. The connector module according to claim 3, wherein the mechanical connection techniques utilize insulation displacement methods.

5. The connector module according to claim 4, wherein some or each of said conductive connectors carry insulation displacement contacts.

6. The connector module according to claim 1, wherein said body of insulating material is formed in a single piece.

7. The connector module according to claim 6, wherein said body of insulating material is formed as a single molding.

8. A connector module for a patching apparatus, said connector module comprising a body of insulating material having a common plane extending therethrough, a plurality of substantially identical jack sockets being defined by said body of insulating material, the plurality of jack sockets being arranged in said common plane, each jack socket having a socket opening at one end thereof, the socket openings of some jack sockets facing in one direction, and the socket openings of the remainder of the jack sockets facing in the opposed direction, the body of insulating material defining a plurality of connector channels, wherein the connector channels extend substantially parallel to one another, and each said connector channel extends across the plurality of jack sockets, and the connector module further comprising a plurality of connectors of conductive material for interconnecting selected jack sockets, one or more of said connectors being received within each said connector channel, and the connector module further comprising a tubular housing in which the body of insulating material and said connectors are removably received, wherein said housing carries co-operating engagement means for engaging with the housings of adjacent connector modules, and wherein said housing carries panel engagement means for engagement with a patch panel of patching apparatus, and further comprising identification means to identify the selected interconnections of said conductive connectors.

9. The connector module according to claim 8, wherein the identification means provide a visual indication.

10. A connector module according to claim 9, wherein each connector module has jack socket openings in opposed ends thereof, and has asymmetrical interconnections which provide different electrical pathways in dependence upon the orientation of the module, and wherein differing color markers are provided at the opposed ends of the connector module to indicate the orientation of the module.

11. A patching apparatus comprising a patch panel, and a plurality of connector modules engaged with said patch panel, wherein each said connector module comprises a body of insulating material having a common plane extending therethrough, a plurality of substantially identical jack sockets being defined by said body of insulating material, the plurality of jack sockets being arranged in said common plane, each jack socket having a socket opening at one end thereof, the socket openings of some jack sockets facing in one direction, and the socket openings of the remainder of the jack sockets facing in the opposed direction, the body of insulating material defining the plurality of connector channels, wherein the connector channels extend substantially parallel to one another, and each said connector channel extends across a plurality of jack sockets, and the connector module further comprising a plurality of connectors of conductive material for interconnecting selected jack sockets, one or more of said connectors being received within each said connector channel, and the connector module further comprising a tubular housing in which the body of insulating material and said connectors are removably received, and wherein a plurality of cut outs are formed in said patch panel, and the housing of each said connector module carries at least one retention tab, the retention tabs of the connector module housings being engaged in corresponding cut outs whereby the connector modules are engaged with the patch panel.

12. Patching apparatus according to claim 11, wherein the housing of each connector module carries co-operating engagement means, and wherein the housings of adjacent connector modules are engaged together by way of said engaging means.

13. A patching apparatus comprising a plurality of connector modules arranged serially, each connector module being connected to the adjacent connector module whereby the patching apparatus is defined, wherein each said connector modular comprises a body of insulating material having a common plane extending therethrough, a plurality of substantially identical jack sockets being defined by said body of insulating material, the plurality of jack sockets being arranged in said common plane, each jack socket having a socket opening at one end thereof, the socket openings of some jack sockets facing in one direction, and the socket openings of the remainder of the jack sockets facing in the opposed direction, the body of insulating material defining a plurality of connector channels, wherein the connector channels extend substantially parallel to one another, and each said connector channel extends across the plurality of jack sockets, and the connector module further comprising a plurality of connectors of conductive material for interconnecting selected jack sockets, one or more of said connectors being received within each said connector channel, and the connector module further comprising a tubular housing in which the body of insulating material and said connectors are removably received, and the housing of each connector module carrying co-operating engagement means, and wherein the housings of adjacent connector modules are engaged together by way of said engaging means.

* * * * *

UNITED STATES PATENT AND TRADEMARK OFFICE
CERTIFICATE OF CORRECTION

PATENT NO. : 6,261,124 B1
DATED : July 17, 2001
INVENTOR(S) : Brock

Page 1 of 1

It is certified that error appears in the above-identified patent and that said Letters Patent is hereby corrected as shown below:

<u>Title page,</u>
Item [73] should read as follows:
-- [73] Assignee: Deltron Emcon Limited --.

Signed and Sealed this

Sixth Day of November, 2001

*Attest:*

*Attesting Officer*

NICHOLAS P. GODICI
*Acting Director of the United States Patent and Trademark Office*